United States Patent Office 3,059,016
Patented Oct. 16, 1962

3,059,016
MANUFACTURE OF ARYL PHOSPHATE ESTERS
Enrique R. Witt, Corpus Christi, Tex., assignor to Celanese Corporation of America, New York, N.Y., a corporation of Delaware
No Drawing. Filed Aug. 5, 1959, Ser. No. 831,716
9 Claims. (Cl. 260—461)

This invention relates to the manufacture of triaryl esters of phosphoric acid. More particularly this invention relates to a procedure for manufacturing triaryl esters of ortho phosphoric acid such as tricresyl phosphate from a wet aryl feed stock.

Triaryl phosphates, notably phosphates of the cresol mixtures or cresol-xylenol mixtures known as cresylic acid, have found widespread industrial uses (e.g. plasticizers). They are manufactured in large quantities by the reaction of phenolic compounds with phosphorus oxychloride according to the following overall equation:

$$3ROH + POCl_3 \rightarrow 3HCl + (RO)_3PO$$

where R stands for an aryl group.

Actually this overall reaction proceeds through these stages, namely $$ROH + POCl_3 \rightarrow HCl + ROPCl_2$$
$$ROH + ROPOCl_2 \rightarrow HCl + (RO)_2POCl$$
$$ROH + (RO)_2POCl \rightarrow HCl + (RO)_3PO$$

However, in the presence of water $POCl_3$ and each of the intermediate reaction products react as follows:

$$POCl_3 + 3H_2O \rightarrow 3HCl + H_3PO_4$$
$$ROPOCl_2 + 2H_2O \rightarrow 2HCl + ROPO(OH)_2$$
$$(RO)_2POCl + H_2O \rightarrow HCl + (RO)_2POOH$$

Under the conditions conventionally employed for the reaction of phenolic compounds with phosphorus oxychloride the various acidic reaction products $H_3PO_4$, $ROPO(OH)_2$ and $(RO)_2POH$ do not react with the phenols and consequently are not converted into the desired triaryl ester $(RO)_3PO$. Also, in the subsequent distillation of the products to recover a heart cut of triaryl ester, the acidic partial esters tend to react in the still to produce spongy polymers which trap the desired triaryl phosphate and thereby reduce the yield of heart cut.

Even small percentages of water in the phenolic feed stock result in a high loss of yield. The presence of one percent water in the feed will reduce the yield of triaryl phosphate by approximately 30%. Actually water contamination is so serious that with 4.8% water in the phenolic feed stock a conventional reaction with phosphorus oxychloride yields no triaryl phosphate at all. Conventional specifications for cresol feed stocks have therefore required that no more than 0.2% water be present.

The prime object of the instant invention is to provide a process for the production of triaryl phosphate which can utilize a water contaminated phenolic feed stock.

A further object of this invention is to provide a process for the production of triaryl phosphate esters by which due compensation can be made for water content in the phenolic feed stock.

Other objects and the advantages of this invention will be apparent from the following detailed description and claims.

According to one aspect of the present invention the phenolic feed material reacted with phosphorus oxychloride is also reacted with an amount of phosphorus pentachloride substantially equal to the molar concentration of water in the phenolic feed stock.

It has been found that phosphorus pentachloride reacts with water according to the following equation:

$$H_2O + PCl_5 \rightarrow 2HCl + POCl_3$$

Moreover the phosphorus pentachloride reacts with the acid esters as follows:

$$ROPO(OH)_2 + 2PCl_5 \rightarrow ROPOCl_2 + 2HCl + 2POCl_3$$
$$(RO)_2PO(OH) + PCl_5 \rightarrow (RO)_2POCl + HCl + POCl_3$$

Thus a mol of phosphorus pentachloride will remove from the reaction mixture a mol of water, and in addition generate a mol of phosphorus oxychloride, a principal reactant of the esterification, and HCl, one of the reaction products of the esterification.

Even though the prime purpose of the phosphorus pentachloride is removal of water from the phenolic feed stock, in practice it has been found unnecessary to provide a preliminary reaction of phosphorus pentachloride with phenolic feed stocks. The actual order of mixing of the three reagents has been found to be irrelevant, apparently because the phosphorus pentachloride reacts as well with the acid mono- and di aryl esters as it does with water itself.

In general it has been found that $PCl_5$ should be employed with phenolic feed stocks containing small proportions of water, preferably up to about 1% of water. For feed stocks containing over about 1% of water a preliminary drying by vacuum distillation is preferred because among other reasons phosphorus pentachloride is more expensive than phosphorus oxychloride. The advantages of the invention are particularly important with feed stocks containing about 0.2 to 1% of water.

Extensive tests have shown that the employment of phosphorus pentachloride in conjunction with phosphorus oxychloride for the esterification does not adversely effect the purity or color of the triaryl ester products. By and large a molar excess of phosphorus pentachloride over the molar quantity of water present in the phenolic feed stocks is not necessary. An excess will not increase the yield or the quality and may in some instances be detrimental because side reactions occur which complicate the recovery of triaryl esters from the reaction product mixture. By the same token less than the stoichiometrically required $PCl_5$ will not remove all the water. Accordingly it is preferable to use about one mol of $PCl_5$ per mol of water in the phenolic feed stock.

The amounts of $POCl_3$ and $PCl_5$ to be employed depend upon the percentage of water in the phenolic material. For example, each part of water present theoretically reacts with 11.56 parts of the phosphorus pentachloride based on the equation:

$$PCl_5 + H_2O \rightarrow POCl_3 + 2HCl$$

The phosphorus oxychloride generated by the reaction is 0.736 times the weight of the phosphorus pentachloride. This quantity should be deducted from the weight of phosphorus oxychloride that would otherwise be employed for the esterification. For illustration 500 grams of a certain phenolic feed containing 1.2% water would be esterified by 70.0 grams of phosphorus pentachloride and 165.0 grams of phosphorus oxychloride. The same feed dried to a 0.25% water content would be esterified with 14.5 grams of phosphorus pentachloride and 205.8 grams of phosphorus oxychloride. The foregoing figures illustrate how the required quantities of $PCl_5$ and $POCl_3$ both vary with the water content of the phenolic feed stock.

Specific examples of hydroxyaryl compounds which may be converted into triaryl phosphates in accordance with the present invention include phenol; ortho-, meta-, and para-cresol; any of the six xylenols; any of the six trimethyl phenols; any of the three tetra-methyl phenols;

penta-methyl phenol; substituted phenols such as the ethyl, isopropyl, n-propyl, n-butyl, sec.-butyl, tert.-butyl, amyl, etc. which correspond to the series of methyl substituted phenols set forth above; phenols substituted with halogen, nitro- and similar groups; etc. Of course, the substituents should preferably be such as to not materially interfere with the course of the reaction.

In carrying out the esterification reaction the conventional conditions may be used, such as heating in the presence of a small amount of catalyst, e.g. magnesium chloride, zinc chloride, titanium tetrachloride or aluminum chloride. It is found that the reaction commences at a lower temperature when the phosphorus pentachloride is present. The peak reaction temperature is generally relatively high, thus, peak temperatures of about 180° C. have been found most suitable for ordinary cresylic acids and higher temperatures e.g. 200° C. are convenient for esterification of higher boiling phenolic materials.

The following examples are given to illustrate this invention further. In the examples the term "oxy ratio" refers to the number of parts by weight of phosphorus oxychloride equivalent to one part by weight of the particular phenolic material; i.e. the weight of $POCl_3$ necessary to esterify one part by weight of cresylic acid, assuming 100% reaction.

Example I

Phosphorus pentachloride, phosphorus oxychloride and cresylic acid were mixed in a batch reactor in the amounts given in the following table, together with 0.4%, based on the weight of cresylic acid, of magnesium chloride as a catalyst. Reaction commenced at a temperature of 40° C. (in contrast to the temperature of 80° C. for the start of reaction in the absense of $PCl_5$) and the temperature increased due to the exothermic reaction. Heat was then applied to raise the temperature to 180° C. After 5 hours of reaction, the mixture was distilled and a heart cut was recovered. This heart cut was then purified in conventional manner. The results are tabulated below for a run on the phenolic feed as received with 1.2% water and for a run on the same feed dried to 0.25% water. (The drying was accomplished by distillation under vacuum with a 97% recovery based on the total wet charge.) The cresylic acid used contained 52% meta para cresol and 48% phenol and had an oxy ratio of 0.477.

|  | Original Feed | Dried Feed |
|---|---|---|
| Percent $H_2O$ | 1.2 | 0.25 |
| Charge of cresylic acid, g | 500.0 | 500.0 |
| $PCl_5$, g | 70.0 | 14.5 |
| $POCl_3$, g | 165.0 | 205.8 |
| Acid number of reactor product | 1.9 | 1.4 |

The products were obtained in good yield and had good color and low acid number, and passed the conventional permanganate test.

Example II

A series of runs A to G were made employing a cresylic acid containing 78% mp-cresol, 17% 2,4-2.5 xylenols, 3% mixed xylenols, 1% o-cresol, and less than 1% of phenol and ethyl phenol. In each instance 500 grams of cresylic acid were employed and 205 grams of phosphorus oxychloride or its equivalent in phosphorus pentachloride mixed with phosphorus oxychloride were used.

(A) 500 g. of cresylic acid of 0.1% water content+4.5 g. $H_2O$ to take to 1% water level, esterified by heating with 205 g. $POCl_3$ in the presence of 2 grams of $MgCl_2$ for 5 hours, the peak reaction temperature being 180° C.

(B) Same as in A, but adding 57.9 g. $PCl_5$ to the cresylic acid and then 162.4 g. $POCl_3$.

(C) Same as B, but adding the cresylic acid to the $PCl_5$, and then adding the $POCl_3$.

(D) Same as B, but adding the cresylic acid to a mixture of the $PCl_5$ and $POCl_3$.

(E) 500 g. of cresylic acid (of 0.1% water content) plus 23.5 ml. $H_2O$ to reach a level of 24 g. water in the reaction, using 278.4 g. $PCl_5$.

(F) Same as E but using only $POCl_3$.

(G) Dried cresylic acid esterified with 162.4 g. $POCl_3$+57.9 g. $PCl_5$, enough to take care of 1% of water, if there had been any present.

In all cases the reaction of $PCl_5$ with wet or dry cresylic was quite brisk, with active evolution of HCl; this was naturally strongest in E, where only $PCl_5$ was used, with a very wet cresylic acid. The temperature rise was, however, not too marked. All $PCl_5$ esterification started reacting at ca 40° C. while the regular $POCl_3$ reaction began at about 80° C. The products were distilled and the heart cuts purified as in Example I. In run A the yield of heart cut was less than 73% of the yield in run B; while in run F no yield of heart cut material was obtained, all the material distilling over at lower temperature. Both the forerun and the residue were much larger for run A than for run B. The yields of heart cut and their acid numbers as well as the acid number of the products after conventional purification are given in the following table.

|  | A | B | C | D | E | F | G |
|---|---|---|---|---|---|---|---|
| Heart Cut Acid No | 20.3 | 4.9 | 3.0 | 3.7 | 19.8 | 105.0 | 100 |
| Acid No. of finished product | 1.36 | 0.004 | 0.004 | 0.005 | 0.004 | | |
| Yield of Heart Cut | 57.7 | 79.1 | 78.9 | 78.9 | 77.3 | | 74.8 |

A special aspect of the instant invention is conversion of partial esters into triaryl esters. The product mixture from an esterification of $POCl_3$ and a phenolic material often contains a substantial fraction of "light ends." These light ends which are recovered from distillation of the triaryl ester product mixture consist of unreacted phenolic compounds, varying amounts of the triaryl ester itself, partial ester-acids and usually some water. While the unreacted phenolic compounds can be reacted further with $POCl_3$ to produce the desired triaryl esters, the partial esters do not react in the same manner and, if they are not removed, their presence in the final product causes the acidity of the product to be higher than desired.

As has been previously outlined $PCl_5$ reacts with the mono- and di-acid esters $(RO)_2P-OOH$, $ROP-O(OH)_2$ as well as with water. The light ends can, therefore, be converted to triaryl phosphate by reaction with $POCl_3$ and $PCl_5$. The quantity of $PCl_5$ to be employed is determined by the water content (on a mol for mol basis) in the manner previously described for phenolic feed stocks. Additionally sufficient $PCl_5$ must be used to compensate for the molar equivalent of the acid esters present. The amount of $POCl_3$ employed depends upon the quantity of unreacted phenolic material present in the light ends, taking into consideration the $POCl_3$ generated from the $PCl_5$ (just as described for the wet phenolic feed stocks).

Following is an example of the conversion of light ends into useful products.

Example III

The light ends used came from a batch of triaryl phosphate produced by reaction of a xylenol of oxy ratio 0.425. The light ends contained 1.7% water as determined by distillation of a sample.

Non-volatile acidity (in addition to small amounts of HCl present from the reaction) was 0.09 meq./g., or acid number=5. The esterification runs were as follows and were carried out in the same manner as described in Example I, except as indicated below:

(A) Wet light ends 500 g.+157 g. $POCl_3$.

(B) Wet light ends 500 g.+108 g. $PCl_5$+77.5 g. $POCl_3$ ($PCl_5$ to react with water=$1.7 \times 5 \times 11.56 = 98.3$. $PCl_5$ to react with acids=0.09 meq./g.$\times 500$ g.$\times 10^{-3}$ eq./meq.$\times 208.3$ g./eq.=9.4 g. $PCl_5$. Total $PCl_5$=98.3

+9.4=107.7=108 g.; $POCl_3=157-0.7363\times108=77.5$ g.).

(C) Dry light ends (dried by vacuum removal of water) 500 g.+157 g. $POCl_3$.

(D) Dry light ends 500 g.+10 g. $PCl_5$+147 g. $POCl_3$.

The product was distilled in conventional manner. The acid number of the reactor product and the yields of heart cut are tabulated below.

|  | Wet Light Ends | | Dry Light Ends | |
| --- | --- | --- | --- | --- |
|  | (A) | (B) | (C) | (D) |
|  | $POCl_3$ Only | $POCl_3$+ $PCl_5$ | $POCl_3$ Only | $POCl_3$+ $PCl_5$ |
| Acid No. of product | 28.4 | 6.0 | 16.0 | 10.5 |
| Heart cut, percent | 31.8 | 66.3 | 62.6 | 73.1 |

It is to be understood that the foregoing detailed description is given merely by way of illustration and that many variations may be made therein without departing from the spirit of my invention.

Having described my invention what I desire to secure by Letters Patent is:

1. In the process for converting a hydroxy aryl compound into a triaryl phosphate through reaction with $POCl_3$, the improvement which comprises substituting $PCl_5$ for a portion of the $POCl_3$ to counteract the detrimental influence of water in the phenolic feed stock.

2. In the process for converting a hydroxyaryl compound to a triaryl phosphate through reaction with $POCl_3$, the improvement which comprises replacing a portion of the $POCl$ with its molar equivalent of $PCl_5$, using about one mole of $PCl_5$ per mole of water present in the hydroxaryl compound feed stock.

3. A process for directly converting a water-containing hydroxy aryl compound feed stock containing up to about 2% water into triaryl phosphates which comprises reacting said feed stock with $POCl_3$ in an amount sufficient to react with a major proportion of the phenols present in said feed stock, and with about one mole of $PCl_5$ per mole of water present in the feed stock.

4. The process of claim 3 wherein cresylic acid is the feed stock and a tertiary phosphate of cresylic acid is produced.

5. Process as set forth in claim 3 in which the water content of the feed stock is in the range of about 0.2 to 2%.

6. A process for converting a mixture containing hydroxy aryl compounds, mono aryl phosphates and diaryl phosphates into triaryl phosphates which comprises reacting said mixture with $POCl_3$ and $PCl_5$, the $POCl_3$ being employed in an amount sufficient to react with a major proportion of said phenolic compounds and the $PCl_5$ being employed in amount of at least about one molecule per free OH group present in said mono and di phosphates and in any water present in the mixture.

7. A process for converting the light ends recovered from the conversion of cresylic acid into a triaryl phosphate, which comprises reacting said light ends with $POCl_3$ and $PCl_5$, the $POCl_3$ being employed in an amount sufficient to react with a major proportion of the phenols present in said light ends and the $PCl_5$ being employed in amount equal to about one molecule per free OH group present in the partial acid esters and in any water present in the light ends.

8. The process of claim 6 wherein said light ends are preliminarily dehydrated.

9. Process as set forth in claim 3 in which the feed stock is cresylic acid containing water and the resulting reaction product is then distilled to recover a heart cut of triaryl phosphate.

References Cited in the file of this patent

UNITED STATES PATENTS

| 2,133,310 | Shuman | Oct. 18, 1938 |
| 2,168,587 | Shuman | Aug. 8, 1939 |
| 2,596,660 | Dickey | May 13, 1952 |

OTHER REFERENCES

Mellor: "Comprehensive Treatise on Inorganic and Theoretical Chemistry," vol. 8, pp. 1012–1013, Longmans, Green and Co., New York, N.Y. (1923).

Kosolapoff: "Organo Phosphorus Compounds," p. 217 (1950 edition), John Wiley and Sons, Inc., New York, N.Y.